(12) United States Patent
Choi et al.

(10) Patent No.: US 11,372,652 B2
(45) Date of Patent: Jun. 28, 2022

(54) APPLICATION PROCESSOR, SYSTEM ON CHIP, AND METHOD OF BOOTING DEVICE

(71) Applicant: SAMSUNG ELECTRONICS CO., LTD., Suwon-si (KR)

(72) Inventors: Jun-ho Choi, Hwaseong-si (KR); Dong-jin Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 285 days.

(21) Appl. No.: 16/386,951

(22) Filed: Apr. 17, 2019

(65) Prior Publication Data

US 2019/0324761 A1 Oct. 24, 2019

(30) Foreign Application Priority Data

Apr. 20, 2018 (KR) .......... 10-2018-0046292

(51) Int. Cl.
*G06F 9/4401* (2018.01)

(52) U.S. Cl.
CPC ............ *G06F 9/441* (2013.01); *G06F 9/4405* (2013.01)

(58) Field of Classification Search
CPC ........ G06F 9/44; G06F 9/4401; G06F 9/4406; G06F 9/441; G06F 9/4411; G06F 9/4414; G06F 9/4415; G06F 9/4416; G06F 9/4418; G06F 9/442; G06F 9/445; G06F 9/44505; G06F 21/57; G06F 11/0757
USPC ........................................................... 713/2
See application file for complete search history.

(56) References Cited

U.S. PATENT DOCUMENTS

| | | | |
|---|---|---|---|
| 6,421,792 B1 * | 7/2002 | Cromer | G06F 11/1417 713/2 |
| 6,963,981 B1 | 11/2005 | Bailey et al. | |
| 7,487,343 B1 * | 2/2009 | Insley | G06F 9/441 713/1 |
| 7,523,350 B2 * | 4/2009 | Lintz, Jr | G06F 11/1417 714/36 |
| 7,765,393 B1 | 7/2010 | Lee et al. | |
| 8,181,007 B2 | 5/2012 | Liu | |
| 2007/0083744 A1 | 4/2007 | Seok | |
| 2008/0082814 A1 * | 4/2008 | Kuo | G06F 9/4403 713/2 |

(Continued)

FOREIGN PATENT DOCUMENTS

| | | |
|---|---|---|
| KR | 10-0778293 B1 | 11/2007 |
| KR | 10-0860402 B1 | 9/2008 |

(Continued)

*Primary Examiner* — Paul Yen
(74) *Attorney, Agent, or Firm* — Sughrue Mion, PLLC

(57) ABSTRACT

A system on chip (SOC) is provided. The system on chip includes a non-volatile memory, an exception detector, and a processor. The non-volatile memory stores a first bootset in a first region, the first bootset including a booting operation bootloader for a first booting operation and stores a second bootset in a second region that is different from the first region. The exception detector is activated after execution of an initialization bootloader, detects an exception occurrence in the system on chip, and generates a reset signal in response to the exception occurrence that is detected. The processor performs a second booting operation by using the second bootset in response to the reset signal received from the exception detector during the first booting operation performed by using the first bootset.

16 Claims, 12 Drawing Sheets

(56) References Cited

U.S. PATENT DOCUMENTS

| | | |
|---|---|---|
| 2012/0117367 A1 | 5/2012 | Lu et al. |
| 2014/0304497 A1* | 10/2014 | Park ..................... G06F 9/4406 |
| | | 713/2 |
| 2015/0371046 A1* | 12/2015 | Chen .................... G06F 21/575 |
| | | 713/2 |
| 2016/0063253 A1 | 3/2016 | Tabone et al. |
| 2017/0046229 A1* | 2/2017 | Hsu ......................... G06F 9/441 |
| 2017/0315818 A1* | 11/2017 | Sh ............................. G06F 3/06 |
| 2017/0322816 A1* | 11/2017 | Parthiban .............. G06F 9/4416 |
| 2018/0088962 A1* | 3/2018 | Balakrishnan ...... G06F 11/1417 |

FOREIGN PATENT DOCUMENTS

| | | |
|---|---|---|
| KR | 10-1418451 B1 | 7/2014 |
| KR | 10-2015-0075867 A | 7/2015 |

\* cited by examiner

FIG. 12

| Flag Information (FI) ||
|---|---|
| Operation | Flag |
| Operation_1 | 'H' |
| Operation_2 | 'H' |
| ⋮ | ⋮ |
| Operation_k | 'H' |
| Operation_k+1 | 'L' |
| ⋮ | ⋮ |

APPLICATION PROCESSOR, SYSTEM ON CHIP, AND METHOD OF BOOTING DEVICE

CROSS-REFERENCE TO RELATED APPLICATION

This application claims priority from Korean Patent Application No. 10-2018-0046292, filed on Apr. 20, 2018, in the Korean Intellectual Property Office, the entire contents of which is incorporated by reference herein in its entirety.

BACKGROUND

1. Field

Apparatuses, devices, methods and articles of manufacture consistent with the present disclosure relate to an application processor, a system on chip (SOC), and a method of booting a device, and more particularly, to an application processor performing a booting operation, an SOC performing a booting operation, and a method of booting a device.

2. Description of Related Art

Computing systems or embedded systems included in various devices may respectively have inherent operating systems (OSs). A bootstrapping process of starting the OS, when the device starts up the OS, is referred to as a booting process. In the booting process, the devices execute bootloaders stored in the devices.

A bootloader is a program used for starting the OS after finishing all the related work required for an appropriate start-up of a kernel, since the bootloader is executed before the start-up of the OS. For example, the bootloader may perform initialization of hardware. A device may update the bootloader stored in the devices as needed. For example, the device may access a server in response to a request of a server, download an image of a bootloader to be upgraded, and update the bootloader.

In the booting process, unexpected exceptions such as aborts may occur. For example, an error may occur in a process of updating the bootloader. In the related art, when an exception occurs during a booting process, an operation is ceased before the start-up of the OS. Unlike a general exception occurrence situation in which an exception occurs after the OS is started, the user of the device may not have any information regarding an exception that occurs during the booting process. In addition, in certain situations, due to full power consumption when the exception occurs during the booting process, the device may be turned off and the user may not have debugging information available. In this case, the user may not normally re-operate the device without support by professional personnel.

Therefore, in a computing system or an embedded system, it would be advantageous to have methods to complement shortcomings such being unable able to detect an exception occurring in a booting process, requiring support from professional personnel for normal operations of the device, and being unable to obtain debugging information.

SUMMARY

It is an aspect to provide a method and devices for safely detecting an exception occurrence in a booting process or during a bootloader image update, safely rebooting a device, and providing information regarding the exception, in an application processor, a system-on-chip, and a method of booting the device.

According to an aspect of an example embodiment, there is provided a system on chip including a non-volatile memory configured to store a first bootset in a first region, the first bootset including a booting operation bootloader for a first booting operation and to store a second bootset in a second region that is different from the first region; an exception detector configured to be activated after execution of an initialization bootloader, detect an exception occurrence in the system on chip, and generate a reset signal in response to the exception occurrence that is detected; and a processor configured to perform a second booting operation by using the second bootset in response to the reset signal received from the exception detector during the first booting operation performed by using the first bootset.

According to another aspect of an example embodiment, there is provided a method of booting a device, the method including activating a watchdog timer after executing an initialization bootloader, by using a processor; resetting the processor, in response to the watchdog timer indicating that an exception occurs during a first booting operation performed by using a first bootset including a booting operation bootloader; and performing, by using the processor, a second booting operation by using a second bootset stored in a second region of a non-volatile memory that is different from a first region in which the first bootset is stored.

According to another aspect of an example embodiment, there is provided an application processor including a register configured to store flag information; a connectivity configured to receive information regarding a bootset image update; and a core configured to store an update bootset for update, which is received from the connectivity, as a first bootset in a non-volatile memory outside the application processor via a non-volatile memory interface and perform a second booting operation by using a second bootset, by loading the second bootset based on the flag information and a reset signal received from an exception detector, when an exception occurs during a first booting operation performed by using the first bootset received from the non-volatile memory interface.

BRIEF DESCRIPTION OF THE DRAWINGS

Example embodiments will be more clearly understood from the following detailed description taken in conjunction with the accompanying drawings in which:

FIG. 12 shows flag information according to an example embodiment.

DETAILED DESCRIPTION

Example embodiments now will be described more fully hereinafter with reference to the accompanying drawings.

Figure 1:
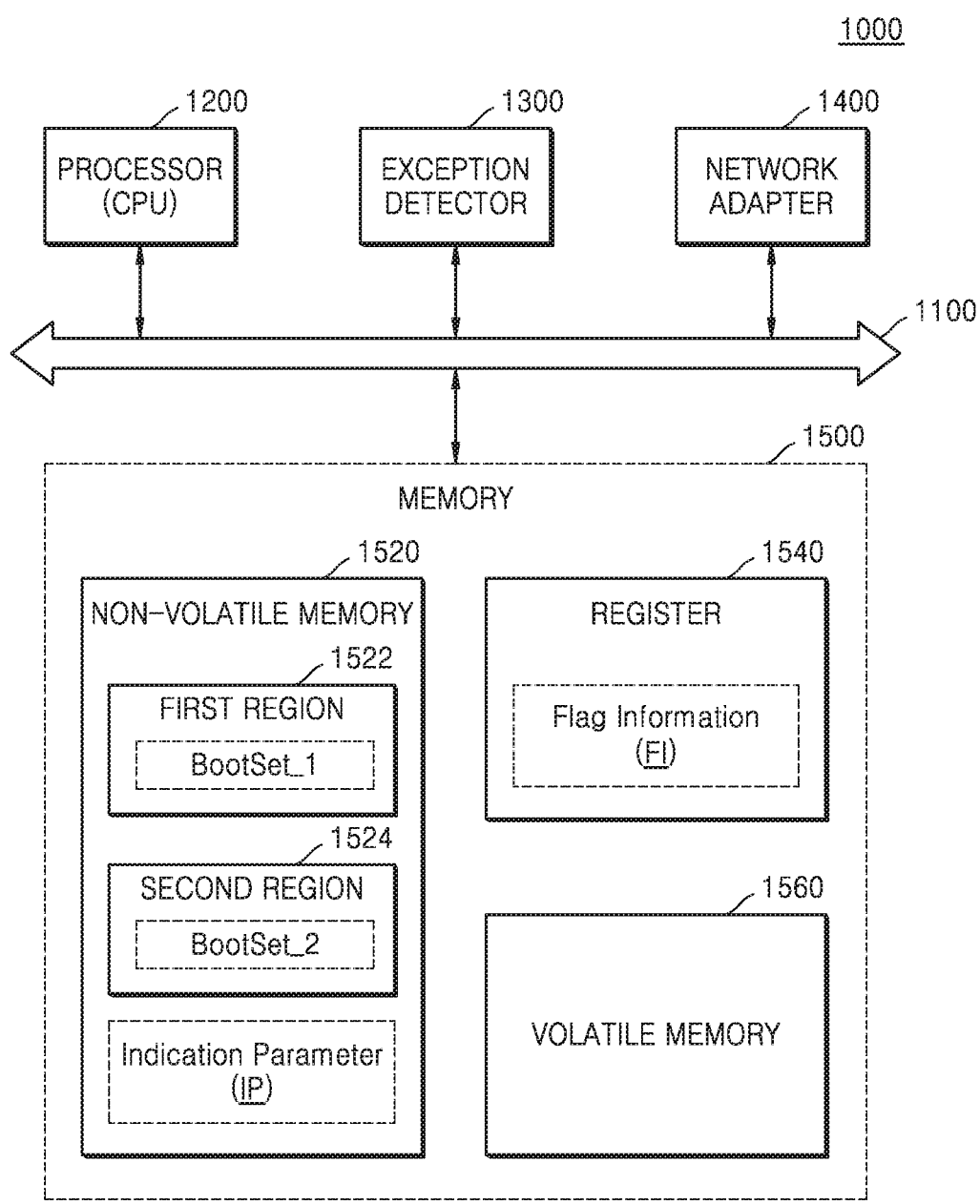
FIG. 1 shows a computing system according to an example embodiment.

FIG. 1 shows a computing system 1000 according to an example embodiment. The computing system 1000 may include a bus 1100, a processor 1200, an exception detector 1300, a network adapter 1400, and a memory 1500. The computing system 1000 may further include components other than the aforementioned components. The computing system 1000 may be included in various devices. The devices may include at least one of an ultra mobile PC (UMPC), a workstation, a netbook, a personal digital assistant (PDA), a portable computer, a web tablet, a wireless phone, a mobile phone, a smart phone, an e-book, a portable multimedia player, a hand-held game console, a navigation device, a black box, and a digital camera. These examples of devices are non-limiting, and other similar devices are contemplated.

The bus 1100 may be used to support communication between various components included in the computing system 1000. Although FIG. 1 shows the computing system 1000 including the bus 1100, the computing system 1000 is not limited thereto and may include a plurality of buses.

The processor 1200 may execute various computing functions. For example, the processor 1200 may execute certain software performing certain calculations or certain tasks. For example, the processor 1200 may include a microprocessor or a central processing unit (CPU). In some example embodiments, the processor 1200 may include a single-core or a multi-core. For example, the processor 1200 may include a multi-core, for example, a dual-core, a quad-core, a hexa-core, and the like. In addition, although FIG. 1 shows the computing system 1000 including the processor 1200, the computing system 1000 is not limited thereto and may include a plurality of processors.

The processor 1200 may perform a booting process before starting an operation system (OS). To perform the booting process, the processor 1200 may execute a bootloader by loading the bootloader in a working memory in the computing system 1000. In some example embodiments, the bootloader may include a bootloader for initialization and a bootloader for a booting operation. In some example embodiments, the bootloader for initialization may include a first bootloader BL0 and a second bootloader BL1, and the bootloader for the booting operation may include a third bootloader BL2 and a fourth bootloader BL3. In some example embodiments, the first bootloader BL0 and the second bootloader BL1 may be stored in the non-volatile memory as a bootset. In some example embodiments, the third bootloader BL2 and the fourth bootloader BL3 may be stored in the non-volatile memory as a bootset.

The exception detector 1300 may detect an exception that occurred in the computing system 1000. In some example embodiments, the exceptions may include exceptions that occurred by a foreign malignant intruder and exceptions that occurred in an update process. For example, an exception may occur in a process of updating a bootloader or a bootset, and the exception detector 1300 may be used in various methods to detect the exception occurrence.

In some example embodiments, the exception detector 1300 may include a watchdog timer that detects an exception occurrence in response to a counter value being equal to a value that is set within the watchdog timer, when a counter initialization operation according to a normal operation of the processor 1200 is not performed. When the processor 1200 executes various programs in a normal state (i.e., a non-exception state), the processor 1200 may provide a signal to the watchdog timer so that a counter of the watchdog timer is initialized. The signal provided by the processor 1200 to the watchdog timer is also referred to as a kick signal. When an exception occurs during an operation of the processor 1200, because the processor 1200 may not provide the kick signal to the watchdog timer, a counter value of the watchdog timer constantly increases, and when the counter value of the watchdog timer equals to the value that is set within the watchdog timer, the watchdog timer may detect the exception occurrence. In some example embodiments, when the watchdog timer detects an exception occurrence, the watchdog timer may reset the processor 1200 by providing a reset signal to the processor 1200.

The network adapter 1400 may be used for connection between the computing system 1000 and a network. For example, the computing system 1000 may be connected to a network by the network adapter 1400 and download bootset update information. The downloaded bootset update information may include a bootset image for update. In addition, as a non-limited example, the bootset update information may include bootset update firmware to be used for update.

The memory 1500 may include a non-volatile memory 1520, a register 1540, and a volatile memory 1560.

The non-volatile memory 1520 may include a first region 1522 and a second region 1524. The non-volatile memory 1520 may store a first bootset BootSet_1, a second bootset BootSet_2, and an indication parameter IP. Each of the first bootset BootSet_1 and the second bootset BootSet_2 may be a binary set including a bootloader for the booting operation, and the indication parameter IP may be a parameter selectively indicating one of a first boot mode in which a booting operation is performed by using the first bootset BootSet_1, and a second boot mode in which a booting operation is performed by using the second bootset BootSet_2. The first bootset BootSet_1 may be stored in the first region 1522, and the second bootset BootSet_2 may be stored in the second region 1524. The first region 1522 and the second region 1524 may be two different regions included in the non-volatile memory 1520. For example, the first region 1522 and the second region 1524 may be two different memory blocks. The non-volatile memory 1520 may include at least one of NAND flash memory, Vertical NAND (VNAND), NOR flash memory, resistive random access memory (RRAM), phase-change random access memory (PRAM), magnetoresistive random access memory (MRAM), ferroelectric random access memory (FRAM), spin transfer torque random access memory (STT-RAM), and the like.

The register 1540 may include flag information FI. The flag information FI may include information for determining whether operations of the processor 1200 are being normally performed. For example, as shown in FIG. 12, the flag information FI may include a table regarding flag values corresponding to the operations performed by the processor 1200. The processor 1200 may update the flag information FI stored in the register 1540 by updating flag values corresponding to the performance of the operations. When an exception occurs during the booting operation of the computing system 1000, the computing system 1000 may indicate to the user an exception occurrence by visually providing the flag information FI to the user, and at the same time, the computing system 1000 may also provide the user information for debugging.

The volatile memory 1560 may store data that is used by the processor 1200. By storing, for example, data that is frequently used when the processor 1200 executes programs, the volatile memory 1560 may reduce access frequency to an external memory device which is relatively slower than the volatile memory 1560 in input and output. The volatile memory 1560 may include at least one of dynamic random access memory (DRAM), synchronous DRAM (SDRAM), double data rate SDRAM (DDR SDRAM), low power double data rate SDRAM (LPDDR SDRAM), graphics double data rate SDRAM (GDDR SDRAM), Rambus DRAM (RDRAM), static RAM (SRAM), and the like.

According to some example embodiments, the computing system 1000 may store bootloaders for the booting operation in the non-volatile memory 1520 as bootsets. In some example embodiments, the computing system 1000 may store the first bootset BootSet_1 and the second bootset BootSet_2 respectively in the first region 1522 and the second region 1524 included in the non-volatile memory 1520. An exception may occur during the booting operation performed by using the computing system 1000. For example, when an exception occurs during the booting operation using the first bootset BootSet_1, the exception detector 1300 may detect the exception occurrence and reset the processor 1200, and the processor 1200 may perform the booting operation by using the second bootset BootSet_2 that is stored separately from the first bootset BootSet_1. The computing system 1000 may update the flag information FI, and after reboot, the computing system 1000 may visually provide the updated flag information FI to the user. Accordingly, by using the computing system 1000 according to some example embodiments, it is possible to detect an exception occurrence during the booting process and/or during update of the bootset image, reboot the computing system 1000 autonomously and without extra devices, and provide information regarding the exception occurrence to the user.

Figure 2:
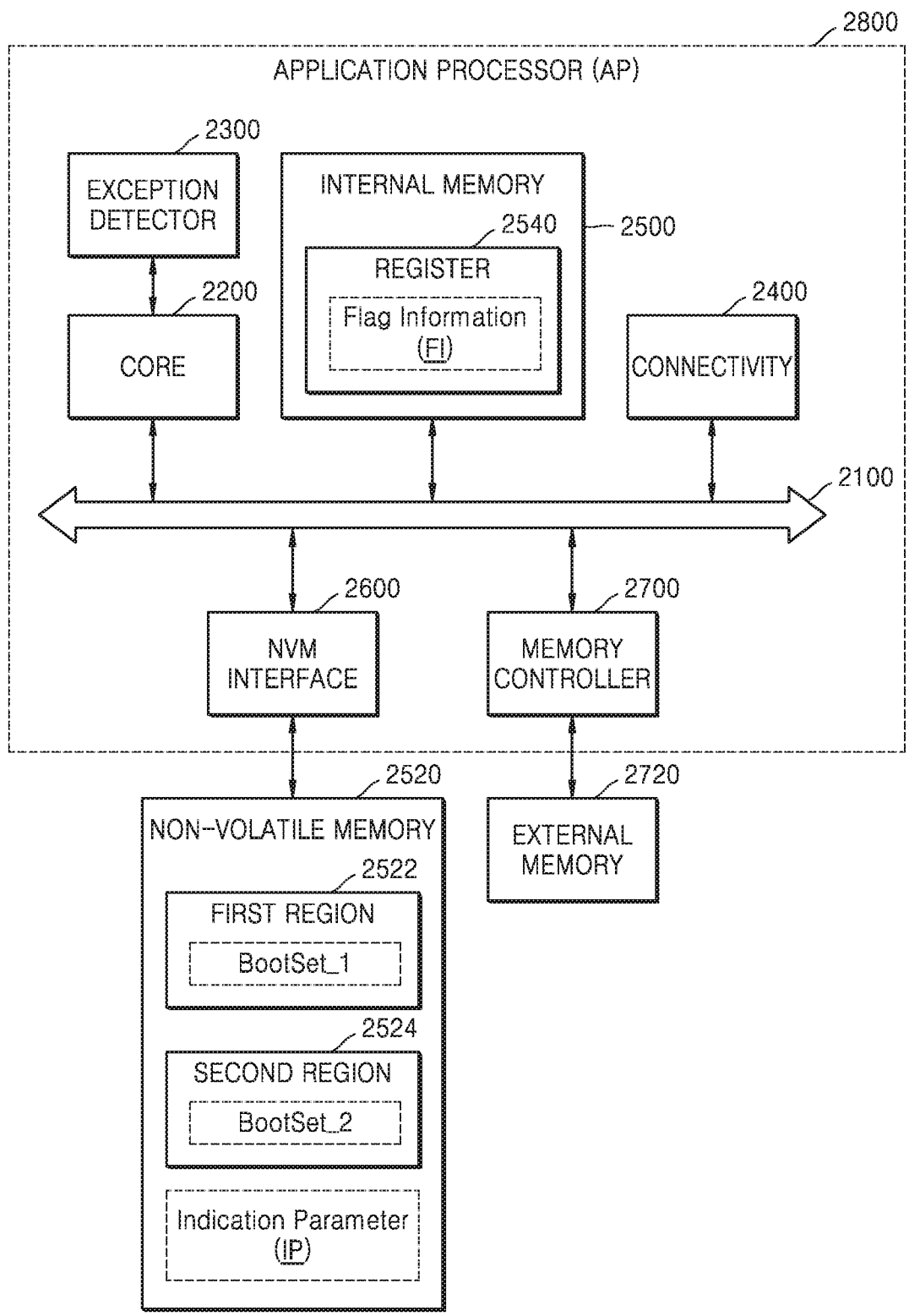
FIG. 2 shows a system on chip (SOC) including an application processor, according to an example embodiment.

FIG. 2 shows a system on chip (SOC) 2000 including an application processor 2800 according to an example embodiment. The SOC 2000 may include the application processor 2800, a non-volatile memory 2520, and an external memory 2720. Although FIG. 2 shows a case in which an exception detector 2300 is in the application processor 2800, the exception detector 2300 is not limited thereto and may be located outside the application processor 2800.

The application processor 2800 may include a bus 2100, a core 2200, the exception detector 2300, a connectivity 2400, an internal memory 2500, a non-volatile memory (NVM) interface 2600, and a memory controller 2700. The internal memory 2500 may include a register 2540. The NVM interface 2600 may be referred to as a non-volatile memory interface. The SOC 2000 may be included in a mobile system.

The core 2200 may perform a function that is substantially the same as that of the processor 1200 of FIG. 1, the exception detector 2300 may perform a function that is substantially the same as that of the exception detector 1300 of FIG. 1, the non-volatile memory 2520 may perform a function that is substantially the same as that of the non-volatile memory 1520 of FIG. 1, and the register 2540 included in the internal memory 2500 may perform a function substantially the same as that of the register 1540 in FIG. 1. About FIG. 2, descriptions overlapping those of FIG. 1 are omitted for conciseness.

The application processor 2800 may execute applications providing web browsers, games, moving pictures, and the like. According to some example embodiments, the application processor 2800 may include a single-core or a multi-core. For example, the application processor 2800 may include a multi-core, for example, a dual-core, a quad-core, a hexa-core, and the like.

The connectivity 2400 may perform wireless communication or wired communication with the outside. For example, the connectivity 2400 may perform ethernet communication, near-field communication (NFC), radio-frequency identification (RFID) communication, mobile communication, memory card communication, Universal Serial Bus (USB) communication, and the like. For example, the connectivity 2400 may include a baseband chipset and support communication, for example, Global System for Mobile communications (GSM), General Packet Radio Service (GPRS), WSCDMA, HSxPA, and the like. The connectivity 2400 may receive information regarding a bootset image update from outside.

The internal memory 2500 may include the register 2540. Besides the register 2540, the internal memory 2500 may further include at least one of various memories such as RAM and/or ROM. For example, the internal memory 2500 may further include a working memory in which a program to be executed by the core 2200 is loaded and stored. The register 2540 may store flag information FI used for determining whether the core 2200 is being normally operated according to operations.

The NVM interface 2600 may provide an interface between the application processor 2800 and the non-volatile memory 2520. The application processor 2800 may receive the first bootset BootSet_1 or the second bootset BootSet_2, which are used for the booting operation, from the non-volatile memory 2520 via the NVM interface 2600. In addition, when the application processor 2800 receives a bootset image to update from the connectivity 2400, the application processor 2800 may store a bootset, which is included in the bootset image to update, as the first bootset BootSet_1 or the second bootset BootSet_2 in the non-volatile memory 2520 via the NVM interface 2600.

The external memory 2720 may include various external memories, for example, volatile memory, non-volatile memory, a register, a cache, and the like.

The SOC 2000 according to some example embodiments may store bootloaders for the booting operations as bootsets in the non-volatile memory 2520. In some example embodiments, the SOC 2000 may store the first bootset BootSet_1 and the second bootset BootSet_2 respectively in the first region 2522 and the second region 2524 of the non-volatile memory 2520. An exception may occur during performance of the booting operation of the SOC 2000. For example, when an exception occurs during the booting operation using the first bootset BootSet_1, the exception detector 2300 may detect the exception occurrence and reset the core 2200 by providing a reset signal to the core 2200 included in the application processor 2800, and the core 2200 may perform a booting operation by using the second bootset BootSet_2 that is stored separately from the first bootset BootSet_1. The SOC 2000 may also update the flag information FI, and after reboot, the SOC 2000 may visually provide the flag information FI, which is updated, to the user. Accordingly, by using the SOC 2000 according to some example embodiments, it is possible to detect an exception occurrence during the booting process and/or the bootset image update, autonomously and safely reboot the device without extra devices, and provide information regarding the exception occurrence to the user.

The computing system 1000 of FIG. 1 and the SOC 2000 of FIG. 2 may be included in devices performing the booting process and perform operations according to a method of booting and a method of updating that will be described below with reference to the drawings. As described below, a device performing the booting process is referred to as a booting device.

Figure 3:
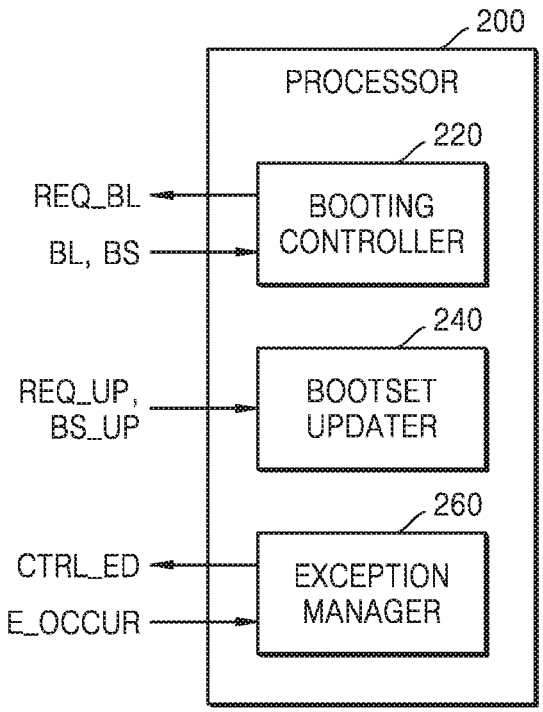
FIG. 3 shows a processor according to an example embodiment.

FIG. 3 shows a processor 200 according to an example embodiment. The processor 200 of FIG. 3 may correspond to the processor 1200 of FIG. 1 or the core 2200 of FIG. 2. In some example embodiments, since the processor 200 of FIG. 3 may be included in the computing system 1000 of FIG. 1 or the SOC 2000 of FIG. 2, the processor 200 of FIG. 3 will be described as being included in an arbitrary booting device performing the booting operation.

The processor 200 may include a booting controller 220, a bootset updater 240, and an exception manager 260.

The booting controller 220 may control the overall booting process of the device. In some example embodiments, the booting process may include an initialization section executing the first bootloader BL0 and the second bootloader BL1, and a booting operation section executing the third bootloader BL2 and the fourth bootloader BL3. Details of the first bootloader BL0 through the fourth bootloader BL3 will be described more fully with reference to FIG. 6. The booting controller 220 may perform a bootloader request by providing a bootloader request signal REQ_BL to a memory outside the processor 200 such that the processor 200 performs the booting process. In response to the request of the booting controller 220, the bootloaders may be loaded on a working memory and executed by the processor 200. When the bootloaders are stored in the memory as a bootset as in FIG. 5A (described below), the bootset may be loaded in the working memory, in response to the request of the booting controller 220, and be executed by the processor 200. The booting controller 220 may perform bootloaders BLs or bootsets BSs by consecutively receiving instructions of bootloads BLs or bootsets BSs loaded in the working memory, in response to the bootloader request signal REQ_BL. The booting process of the processor 200 that is controlled by the booting controller 220 will be described with reference to FIGS. 4 through 6 below.

The bootset updater 240 may update bootsets. The bootset updater 240 may receive an update request signal REQ_UP and bootset update information BS_UP received from outside of the processor 200, through various networks. The processor 200 may determine whether to perform a bootset update based on the update request signal REQ_UP, and may also update the bootsets by using update bootsets included in the bootset update information BS_UP. The process of updating bootset of the processor 200, which is performed by the bootset updater 240, will be described with reference to FIGS. 7 and 8 below.

The exception manager 260 may manage an exception that may occur during operations of the processor 200. For example, in the initialization section, the exception manager 260 may provide an exception detector control signal CTRL_ED to activate an external exception detector. In addition, when the processor 200 is normally operated, the processor 200 may provide a kick signal to the exception detector for each operation or at certain cycles. In some example embodiments, when an exception occurrence is detected by the exception detector 230 during the booting operation, the exception detector 230 may provide an exception occurrence signal E_OCCUR to the exception manager 260. When the exception manager 260 receives the exception occurrence signal E_OCCUR, the processor 200 may repeat the booting process from the beginning. The repetition of the booting operation of the processor 200 will be referred to as a reset of the processor 200. Accordingly, when the exception manager 260 receives the exception occurrence signal E_OCCUR, the processor 200 may be reset. Therefore, the exception occurrence signal E_OCCUR may be referred to as a reset signal.

Each of the booting controller 220, the bootset updater 240, and the exception manager 260 may be implemented as hardware. Alternatively, when a series of algorithms performed by the aforementioned components may be stored as software in the memory included in the device, by loading the memory storing the algorithms, the processor 200 may execute the memory and perform functions of the booting controller 220, the bootset updater 240, and the exception manager 260. However, the configurations of the aforementioned components are not limited thereto, and each of the booting controller 220, the bootset updater 240, and the exception manager 260 may be implemented as a combination of hardware and software, for example, firmware.

Figure 4:
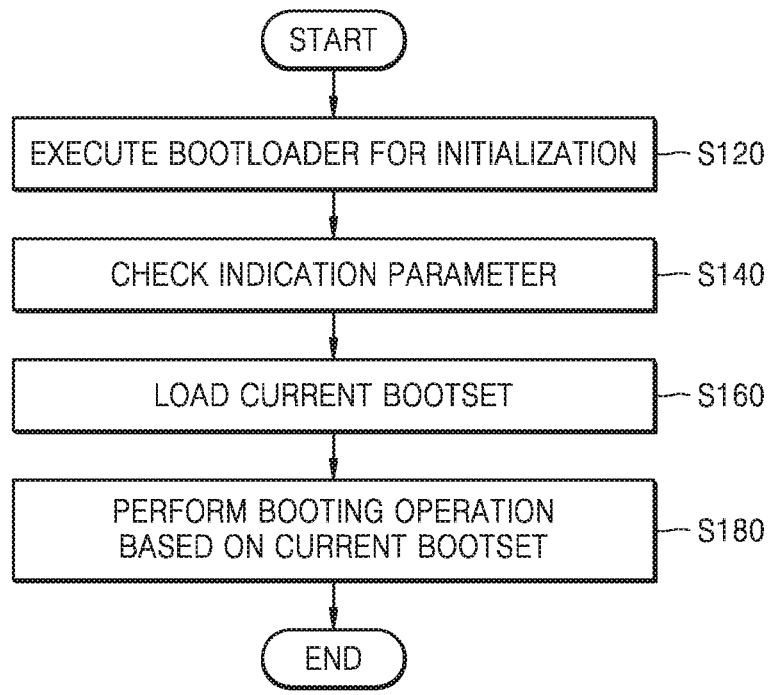
FIG. 4 shows a flowchart of a method of booting by using a booting device, according to an example embodiment.

FIG. 4 shows a flowchart of a method of booting by using the booting device, according to an example embodiment. The booting process may include the initialization section and the booting operation section. FIG. 4 is described with reference to FIG. 3.

In the initialization section, the booting device may execute the bootloader for initialization (S120). For example, the processor 200 may execute the bootloader for initialization by loading the bootloader for initialization, which is stored in the memory included in the device, in the working memory.

The device may check an indication parameter IP (S140). For example, the processor 200 of the device may check the indication parameter IP stored in the non-volatile memory. Referring to FIG. 1 or FIG. 2, by checking the indication parameter, the device may determine one of the first bootset BootSet_1 stored in the first region of the non-volatile memory and the second bootset BootSet_2 stored in the second region of the non-volatile memory 520 as a current bootset, and use the current bootset in the following booting operations. For example, when the indication parameter IP indicates a first boot mode using the first bootset BootSet_1, the current bootset may be the first bootset BootSet_1, and in the following operations, the booting device may perform the booting operations by using the first bootset BootSet_1. Although operations S120 and S140 are separately illustrated in FIG. 4, operation S140 may be performed in the initialization section in which operation S120 is performed. That is, in some example embodiments, operation S120 and operation S140 may be combined. For example, according to execution of a second bootloader BL1 among the bootloaders for initialization, the processor 200 may check the indication parameter IP stored in the non-volatile memory 1520 in the computing system 1000 of FIG. 1, or in the non-volatile memory 2520 in the case of the SOC 2000 of FIG. 2.

The booting device may load the current bootset that has been determined (S160). For example, the processor 200 may load the current bootset that is determined in operation S140 in the working memory. In some example embodiments, in operation S160 in which the bootset is loaded, although the bootset may be loaded in the working memory at one time, it is also possible to consecutively load bootloaders included in the bootset in the working memory.

In the booting operation section, the booting device may perform a booting operation based on the current bootset that has been loaded in the working memory (S180). For example, the processor 200 may consecutively perform the third bootloader BL2 and the fourth bootloader BL3. The performance of the aforementioned bootloaders will be more fully described with reference to FIG. 6 below.

Figure 5A:
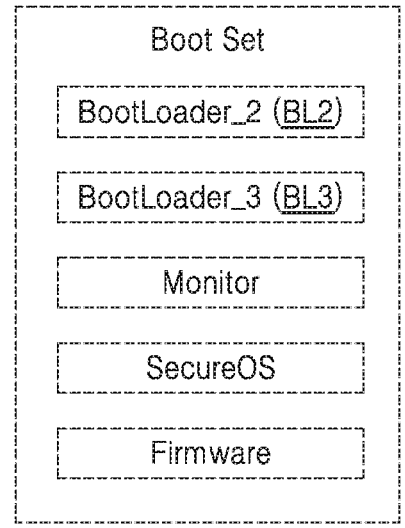
FIG. 5A shows a bootset according to an example embodiment.

FIG. 5A shows a bootset for a booting operation according to an example embodiment. In some example embodiments, the first bootset BootSet_1 or the second bootset BootSet_2 shown in FIGS. 1 and 2 may be a binary set that is the same as the bootset shown in FIG. 5A.

The bootset for booting operation may include a third bootloader BL2 and a fourth bootloader BL3. In some example embodiments, the bootset may further include a monitor, a secure OS, and firmware. The secure OS may indicate an operation system to which a security kernel having a security function is additionally planted to protect the booting device from various hacking that may be caused due to inherent defects of an operating system, and the firmware may indicate software modified to be in a hardware-like state, the software being required for the booting operation.

The booting device may perform the booting operation by executing the third bootloader BL2 and the fourth bootloader BL3. For example, by executing the third bootloader BL2 and the fourth bootloader BL3, the booting device may initialize various kinds of hardware such as a processor or a memory in the booting device, and set operation variables of the various kinds of hardware. As a non-limited example, by executing the third bootloader BL2, it is possible to set access timing of the internal memory or the like. Devices to be initialized or set by executing the third bootloader BL2 or the fourth bootloader BL3 may be different according to various implementation methods, and it may be understood that the devices to be initialized or set do not limit the technical idea according to example embodiments of the present disclosure. The third bootloader BL2 and the fourth bootloader BL3 are referred to as bootloaders for the booting operation.

The booting device may execute a monitor such that the processor 200 may function as an interface for fluent switching between security software and common software.

According to an example embodiment, the booting device may establish the bootset by using the third bootloader BL2 and the fourth bootloader BL3 and store the aforementioned bootloaders in the memory as the bootset. For example, the booting device may store the third bootloader BL2 and the fourth bootloader BL3 as a bootset in the non-volatile memory. In some example embodiments, the booting device may include two bootsets including bootloaders for the booting operations, for example, the first bootset BootSet_1 and the second bootset BootSet_2, and may store the bootsets respectively in the first region and the second region of the non-volatile memory. Details thereof will be described with reference to FIG. 5B.

Although not illustrated in FIG. 5A, in some cases, the bootset may further include the second bootloader BL1. In other words, in some cases, the bootset may include the second bootloader BL1, the third bootloader BL2, and the fourth bootloader BL3. That is, according to implementation methods, the bootset may or may not include the second bootloader BL1.

Figure 5B:
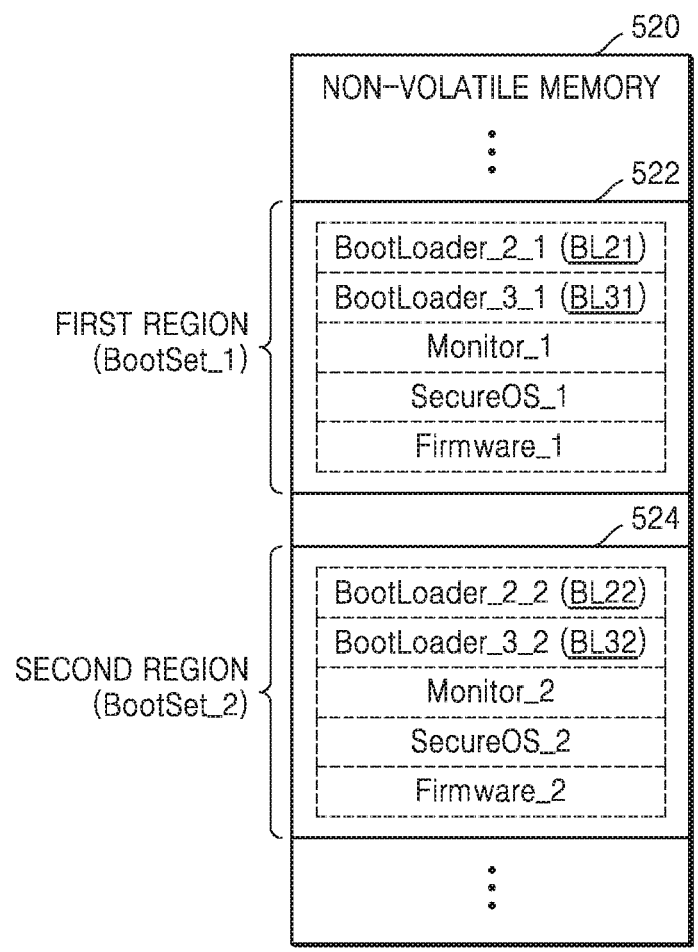
FIG. 5B shows a non-volatile memory storing a first bootset and a second bootset, according to an example embodiment.

FIG. 5B shows a non-volatile memory 520 storing the first bootset BootSet_1 and the second bootset BootSet_2, according to an example embodiment. The non-volatile memory 520 of FIG. 5B may be the non-volatile memory 1520 of FIG. 1 or the non-volatile memory 2520 of FIG. 2. The non-volatile memory 520 may include a first region 522 and a second region 524.

The first bootset BootSet_1 may be stored in the first region 522 of the non-volatile memory 520, and the second bootset BootSet_2 may be stored in the second region 524 of the non-volatile memory 520. Each of the first bootset BootSet_1 and the second bootset BootSet_2 may have a configuration that is identical to the bootset described with reference to FIG. 5A. In other words, the first bootset BootSet_1 may include a third bootloader BL21 of the first bootset BootSet_1, a fourth bootloader BL31 of the first bootset BootSet_1, a first monitor Monitor_1, a first secure operation system SecureOS_1, and first firmware Firmware_1, and the second bootset BootSet_2 may include a third bootloader BL22 of the second bootset BootSet_2, a fourth bootloader BL32 of the second bootset BootSet_2, a second monitor Monitor_2, a second secure operation system SecureOS_2, and second firmware Firmware_2.

A first region 522 in which the first bootset BootSet_1 is stored and the second region 524 in which the second bootset BootSet_2 is stored may be physically separated regions in the non-volatile memory 520. For example, the first region 522 and the second region 524 may be two different memory blocks. However, the first region 522 and the second region 524 are not limited thereto and may also be two different memory sub blocks.

Although not illustrated in FIG. 5B, in some cases, each of the first bootset BootSet_1 and the second bootset BootSet_2 may further include the second bootloader BL1. That is, according to implementation methods, each of the first bootset BootSet_1 and the second bootset BootSet_2 may or may not include the second bootloader BL1.

The booting device according to an example embodiment may store the first bootset BootSet_1 and the second bootset BootSet_2 respectively in the first region 522 and the second region 524 that are separate from each other. By doing so, when an exception occurs during a booting operation by using one of the two bootsets, the booting device may perform again the booting operation by using the other bootset.

Figure 6:
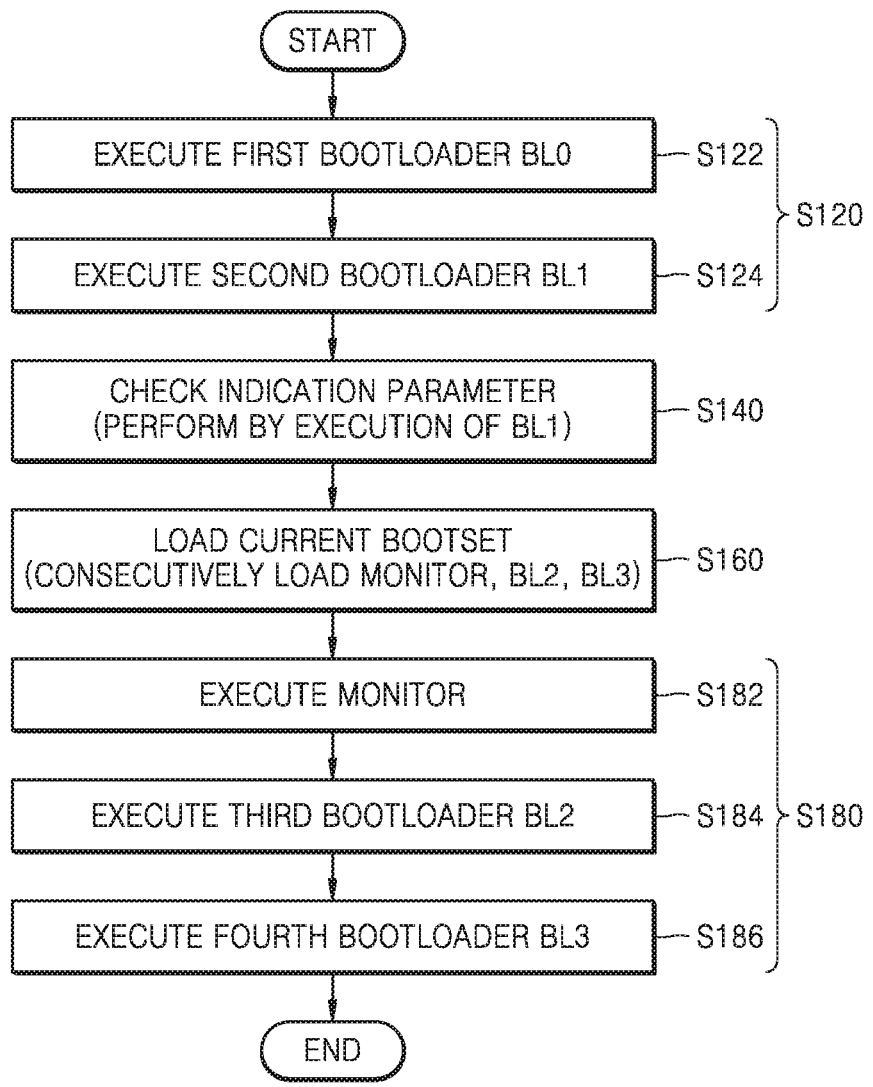
FIG. 6 shows a flowchart of a method of booting by the booting device, according to an example embodiment.

FIG. 6 shows a flowchart of a method of booting by the booting device, according to an example embodiment. FIG. 6 may be a more detailed flowchart of a method of booting that is described in FIG. 4, according to an example embodiment.

Operation S120 of FIG. 4 may include executing the first bootloader BL0 by the booting device (S122) and executing the second bootloader BL1 by the booting device (S124). Operation S120 may be referred to as a booting initialization section, and the first bootloader BL0 and the second bootloader BL1 may be bootloaders for booting initialization.

In operation S122, the booting device may initialize basic functions of the booting device by executing the first bootloader BL0. For example, the booting device may initialize a clock in the booting device by executing the first bootloader BL0. As a non-limited example, the first bootloader BL0 may be stored in Read Only Memory (ROM) included in the booting device. The booting device may load the second bootloader BL1 by executing the first bootloader BL0.

In operation S124, the booting device may execute the second bootloader BL1. The booting device may execute the second bootloader BL1 and check an indication parameter IP stored in the non-volatile memory. In other words, operation S140 of checking the indication parameter IP may be performed by executing the second bootloader BL1 in operation S124.

In some example embodiments, operation S124 may be omitted when the second bootloader BL1 is included in a bootset. In this case, the booting device may execute the second bootloader BL1 in operation S180 and check the indication parameter IP stored in the non-volatile memory by executing the first bootloader BL0. In other words, in this case, operation S140 of checking the indication parameter IP may be performed by executing the first bootloader BL0 in operation S122.

In operation S140, the booting device may determine a current bootset to be used in a following booting process by checking the indication parameter IP stored in the non-volatile memory. In other words, by checking the indication parameter IP, the booting device may determine which one of the first bootset BootSet_1 and the second bootset BootSet_2 will be used for performance of the following booting operations.

In operation S160, the booting device may load the current bootset that has been determined. For example, when the indication parameter IP indicates the first boot mode, the booting device may load the first bootset BootSet_1. In this case, in some example embodiments, the booting device may consecutively load the monitor, the third bootloader BL2, and the fourth bootloader BL3 that are included in the first bootset BootSet_1. In some example embodiments, the first bootset BootSet_1 may further include the second bootloader BL1, and in this case, the booting device may consecutively load the second boot loader BL1, the monitor, the third boot loader BL2, and the fourth bootloader BL3 that are included in the first bootset BootSet_1.

Operation S180 of FIG. 4 may include executing the monitor by the booting device (S182), executing the third bootloader BL2 by the booting device (S184), and executing the fourth bootloader BL3 by the booting device (S186).

In operation S182, the booting device may load the third bootloader BL2 by executing the monitor.

In operations S184 and S186, the booting device may perform a booting operation by executing the third bootloader BL2 and the fourth bootloader BL3. As described with reference to FIG. 5A, for example, the booting device may initialize various kinds of hardware such as a processor or a memory by executing the third bootloader BL2 and the fourth bootloader BL3.

According to an example embodiment, the booting device may identify a presence of a bootset update request by executing the fourth bootloader BL3 and may update the bootset by using a bootset image when there is the bootset update request. A method of updating the bootset will be described with reference to FIGS. 7 and 8 below.

Figure 7:
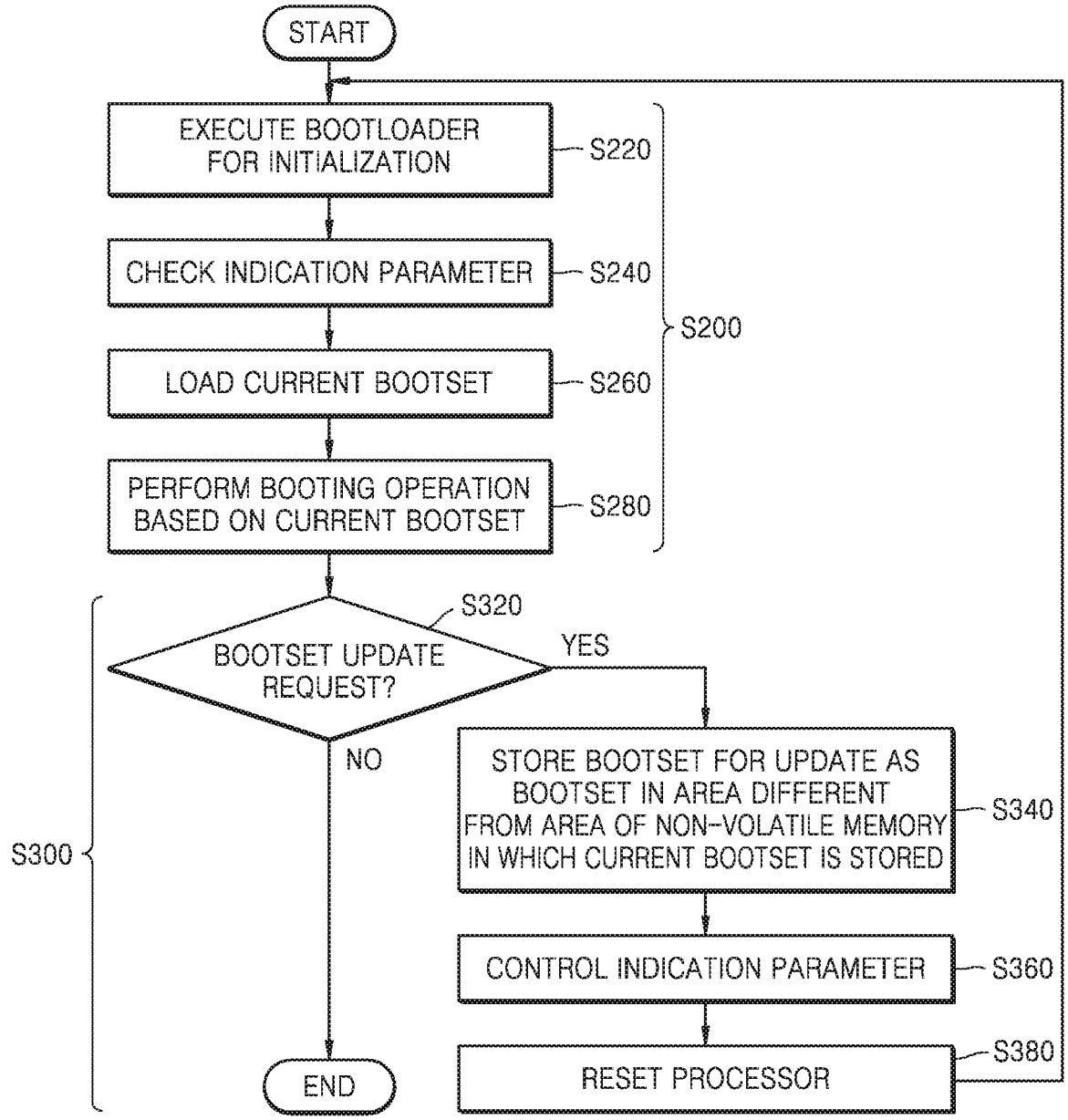
FIG. 7 shows a flowchart of a method of bootset update by using the booting device, according to an example embodiment.

FIG. 7 shows a flowchart describing a method of bootset update by the booting device, according to an example embodiment. The bootset update by using the booting device may be performed in the booting process. FIG. 7 is described with reference to FIG. 3. In other words, the bootset update described in FIG. 7 may be performed by the booting device including the computing system 1000 of FIG. 1 or the SOC 2000 of FIG. 2.

Operation S200, which indicates a booting process, may correspond to a method of booting shown in FIG. 4 or a method of booting shown in FIG. 6. For example, operation S220 may correspond to operation S120 in FIG. 4 or FIG. 6, operation S240 may correspond to operation S140 in FIG. 4 or FIG. 6, operation S260 may correspond to operation S160 in FIG. 4 or FIG. 6, and operation S280 may correspond to operation S180 in FIG. 4 or FIG. 6.

The booting device may identify a presence of a bootset update request (S320). When no bootset update request is identified (operation S320, NO), the process ends. When the bootset update request is identified (operation S320, YES), the booting device may perform the following operations.

When the bootset update request is identified, the booting device may store a bootset for update as a bootset in a region that is different from the region in which the current bootset is stored in the non-volatile memory (S340). For example, when the booting operation is performed by using the first bootset BootSet_1 in operation S200, the booting device may store the bootset for update as a second bootset BootSet_2 in a second region that is an area different from the first region in which the first bootset BootSet_1 is stored.

The booting device may control the indication parameter (S360). For example, when the booting operation is performed by using the first bootset BootSet_1 in operation S200, the booting device may change the indication parameter IP that indicates the first boot mode using the first bootset BootSet_1 to indicate a second boot mode using a second bootset BootSet_2. By controlling the indication parameter IP, the booting device may perform booting operations by using the updated bootset in the following booting processes.

The booting device may reset the processor (S380). Operation S200 may be repeated when the booting device resets the processor. For example, when the bootset for update is stored as the second bootset in the second region of the non-volatile memory and operation S200 is repeated, in operation S240 repeated after operation S380, the booting device may determine a current bootset as the second bootset BootSet_2 by checking the indication parameter. Accordingly, in operation S280 repeated after operation S380, the booting device may perform a booting operation based on the second bootset BootSet_2 that has been updated.

Operation S300, which includes operations S320, S340, S360, and S380, may be performed by execution of the fourth bootloader BL3 (see FIG. 5A) in operation S280. For example, referring to FIG. 6, operation S300 in FIG. 7 may be performed as the booting device executes the fourth bootloader BL3 in operation S186.

Figure 8:
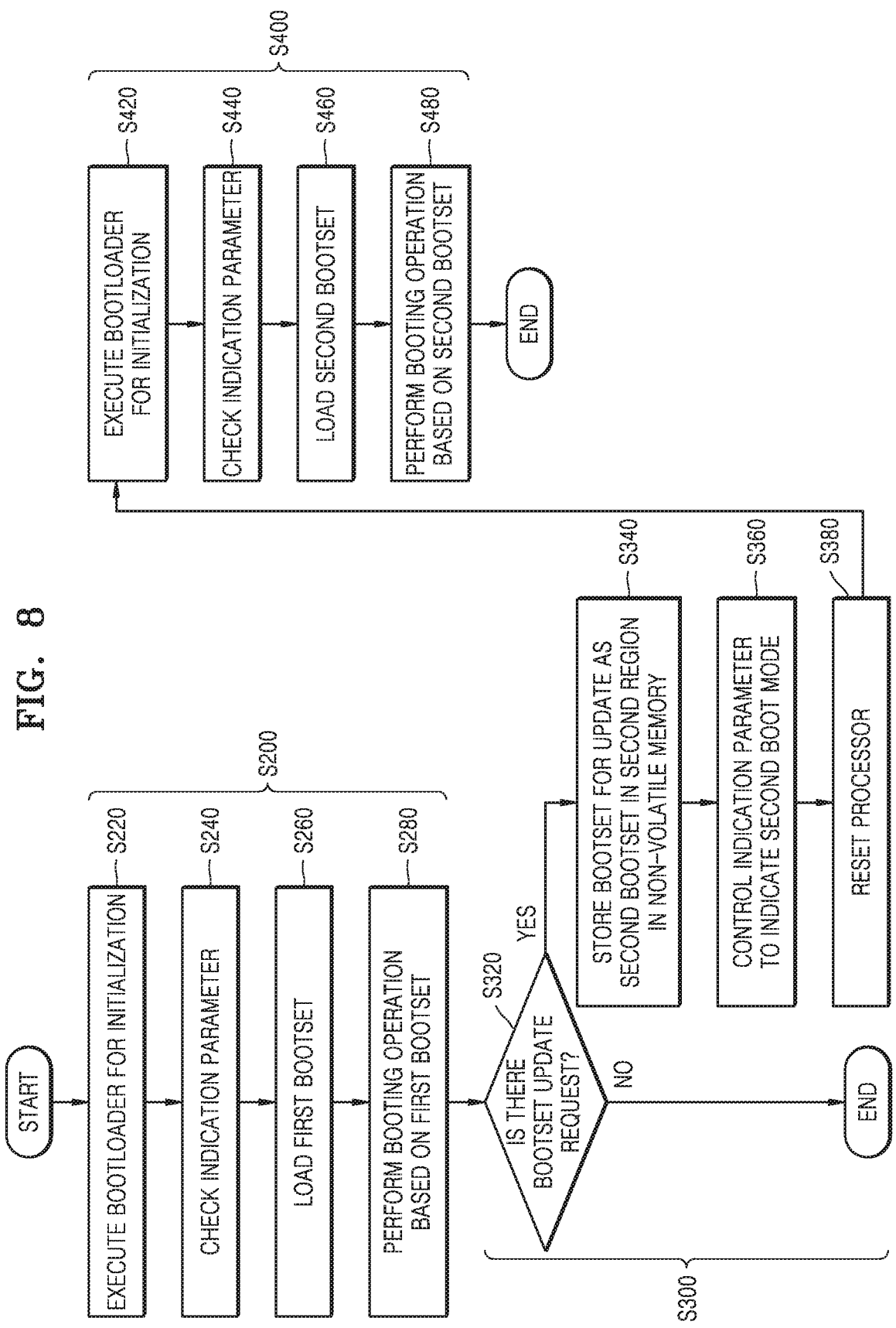
FIG. 8 shows a flowchart of a method of bootset update by using the booting device, according to an example embodiment.

FIG. 8 shows a flowchart of a method of updating a bootset by using the booting device, according to an example embodiment. FIG. 8 shows a flowchart of a method of updating when the booting device updates the bootset as the second bootset BootSet_2, according to an example embodiment. FIG. 8 is described with reference to FIG. 3.

The booting device may execute the bootloaders for initialization (S220). For example, the booting device may execute the first bootloader BL0 and/or the second bootloader BL1.

The booting device may check the indication parameter IP (S240). In operation S240, it is assumed and described that the indication parameter IP indicates a first boot mode using the first bootset BootSet_1. By checking the indication parameter IP, the booting device may determine a current bootset as the first bootset BootSet_1.

The booting device may load the first bootset BootSet_1 in the working memory (S260). For example, the booting device may load the first bootset BootSet_1, which is stored in the first region in the non-volatile memory, in the working memory. In some example embodiments, the booting device may consecutively load the monitor, the third bootloader BL2, and the fourth bootloader BL4 that are included in the first bootset BootSet_1, in the working memory.

The booting device may perform the booting operation based on the first bootset BootSet_1 that has been loaded in the working memory (S280). Operation S300 may be performed due to execution of the fourth bootloader BL3 during the booting operation using the first bootset BootSet_1.

The booting device may identify the presence of the bootset update request (S320).

When the bootset update request is not identified (operation S320, NO), the process ends. When the bootset update request is identified (operation S320, YES), the booting device may store the bootset for update as the second bootset BootSet_2 in the second region included in the non-volatile memory (S340).

The booting device may control the indication parameter IP indicating the first boot mode to indicate the second boot mode in which the second bootset BootSet_2 is used (S360). That is, the booting device may change the indication parameter IP from the first boot mode to the second boot mode. By controlling the indication parameter IP to indicate the second boot mode, the booting device may perform a booting operation by using the second bootset BootSet_2 in operation S400 that will be performed later.

The booting device may reset the processor (S380). When the booting device resets the processor, a booting process of operation S400 may be performed.

The booting device may re-execute the bootloader for initialization (S420). For example, the booting device may execute the first bootloader BL0 and/or the second bootloader BL1.

The booting device may check an indication parameter (S440). By checking the indication parameter IP, the booting device may determine the current bootset as the second bootset BootSet_2.

The booting device may load the second bootset BootSet_2 (S460). For example, the booting device may load the second bootset BootSet_2 stored in the second region of the non-volatile memory in the working memory. In some example embodiments, the booting device may consecutively load a monitor, a third bootloader BL2, and a fourth bootloader BL3 included in the second bootset BootSet_2.

The booting device may perform a booting operation based on the second bootset BootSet_2 that has been loaded in the working memory (S480).

According to an example embodiment, the booting device performs an update operation on a bootset that is different from the bootset that has been used, in response to the bootset update request. By performing the update operation on the bootset that is different from the bootset that has been used, the booting operation may be tried by using the bootset that has been used when an exception occurs during the bootset update operation. Therefore, despite the exception occurrence during the bootset update operation, the booting device may be normally rebooted. Below, a method of booting when an exception occurs in a booting process of the booting device will be described.

Figure 9:
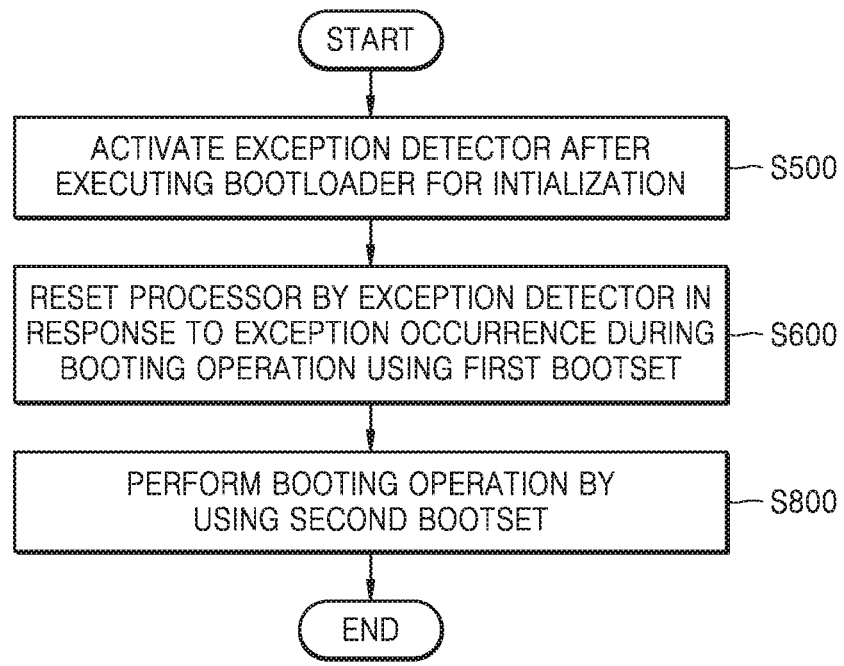
FIG. 9 shows a flowchart of a method of booting the booting device in a case in which an exception occurs, according to an example embodiment.

FIG. 9 shows a flowchart of a method of booting of the booting device when an exception occurs, according to an example embodiment. FIG. 9 is described with reference to FIG. 3. In other words, the booting process described in FIG. 9 may be performed by the booting device including the computing system 1000 of FIG. 1 or the SOC 2000 of FIG. 2.

After executing the bootloader for initialization, the booting device may activate the exception detector (S500). The bootloader for initialization may include the first bootloader BL0 and/or the second bootloader BL1. In some example embodiments, the booting device may activate the exception detector by executing the second bootloader BL1.

When an exception occurs during the booting operation by using the first bootset BootSet_1, the exception detector may reset the processor 200 (S600). For convenience of explanation, in operation S600, the indication parameter IP is described as indicating the first boot mode using the first bootset BootSet_1. When the indication parameter IP indicates the first boot mode, the booting device may perform the booting operation by using the first bootset BootSet_1. In some example embodiments, the exception detector 1300 may include a watchdog timer that detects an exception occurrence based on a counter value that equals a value that is set within the watchdog counter since a counter initialization operation according to a normal operation of the processor 1200 is not performed. When an exception occurs during the booting operation performed by the booting device, the processor 200 of the booting device may not provide a kick signal to the watchdog timer such that the watchdog timer keeps running. Thus, the counter value of the watchdog timer becomes equal to the value set within the watchdog timer, and the watchdog timer may detect the exception occurrence. The watchdog timer may reset the processor 200 by providing a reset signal to the processor 200, in response to the exception occurrence that has been detected.

The booting device may perform a booting operation by using the second bootset BootSet_2 (S800). Since the processor 200 is reset in operation S600, the booting device performs the booting process shown in FIG. 4, and the second bootset BootSet_2 may be used in the booting operation section during the booting process. In this case, when an exception has occurred during the booting operation by using the first bootset BootSet_1 despite the indication parameter IP still indicating the first boot mode, the booting device may perform the booting operation by using the second bootset BootSet_2.

According to a method of booting according to an example embodiment, the exception detector may reset the processor 200 by providing a reset signal to the processor 200 after detecting the exception occurrence, and the processor 200 may perform the booting operation by using the second bootset BootSet_2 that is stored separately from the first bootset BootSet_1. The booting device may also update the flag information FI, and after reboot, the booting device may visually provide the flag information FI, which has been updated, to the user. By using a method of booting according to an example embodiment, it is possible to detect an exception occurrence during the booting process or the bootset image update, autonomously and safely reboot the booting device, and provide information regarding the exception to the user.

Figure 10:
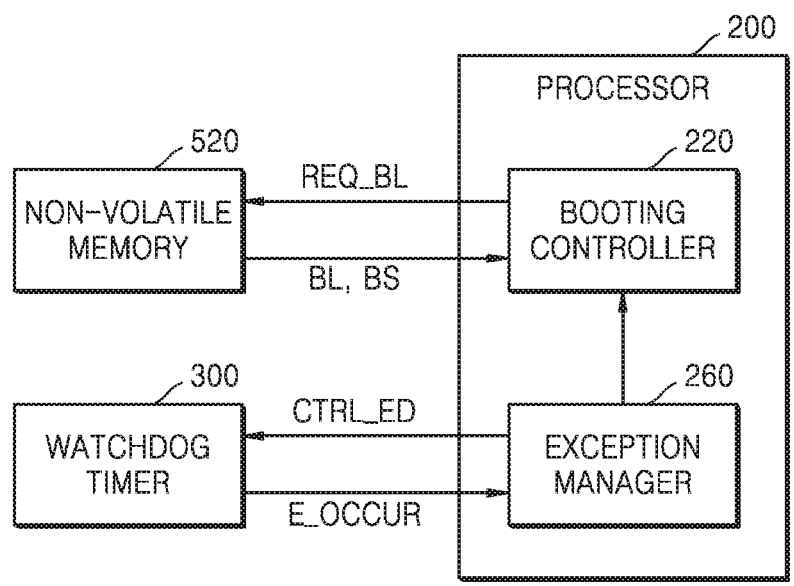
FIG. 10 is a booting device including a processor, a watchdog timer, and a non-volatile memory, according to an example embodiment.

FIG. 10 shows a booting device including a processor 200, a watchdog timer 300, and a non-volatile memory 520, according to an example embodiment. FIG. 10 shows an example embodiment in which an exception detector is the watchdog timer 300. However, the exception detector is not limited thereto and may include various configurations that may detect an exception occurrence. The booting device of FIG. 10 may include the computing system 1000 of FIG. 1 and the SOC 2000 of FIG. 2. About the processor 200 of FIG. 10, descriptions overlapping with those of FIG. 3 are omitted for conciseness.

By checking the indication parameter IP stored in the non-volatile memory 520, the booting controller 220 may perform the booting operation by using one of the first bootset BootSet_1 and the second bootset BootSet_2. The booting controller 220 may load the bootloader BL or the bootset BS in the working memory by providing the bootloader request signal REQ_BL to the non-volatile memory, and may also control the processor 200 to execute the bootloader BL or the bootset BS loaded in the working memory from the non-volatile memory 520.

When the processor 200 executes the first bootloader BL0 in the booting process, the exception manager 260 may activate the watchdog timer 300 by providing the exception detector control signal CTRL_ED to the watchdog timer 300.

When an exception occurs during the booting operation that is performed by the processor 200, the watchdog timer 300 may detect the exception occurrence and may provide an exception occurrence signal E_OCCUR to the exception manager 260 in response to the exception occurrence that has been detected. The exception manager 260 may reset the processor 200 in response to the exception occurrence signal E_OCCUR. The exception occurrence signal E_OCCUR may be referred to as a reset signal.

The booting controller 220 may repeat the booting process as the exception manager 260 receives the reset signal from the watchdog timer 300. In this case, the booting controller 220 may recognize the exception occurrence, based on a signal received from the exception manager 260. For convenience of explanation, when the exception occurs during the booting process by using the first bootset BootSet_1, in a reboot process, the booting controller 220 may control the processor 200 to perform the booting operation by using the second bootset BootSet_2 despite the indication parameter IP indicating the first boot mode.

Figure 11A:
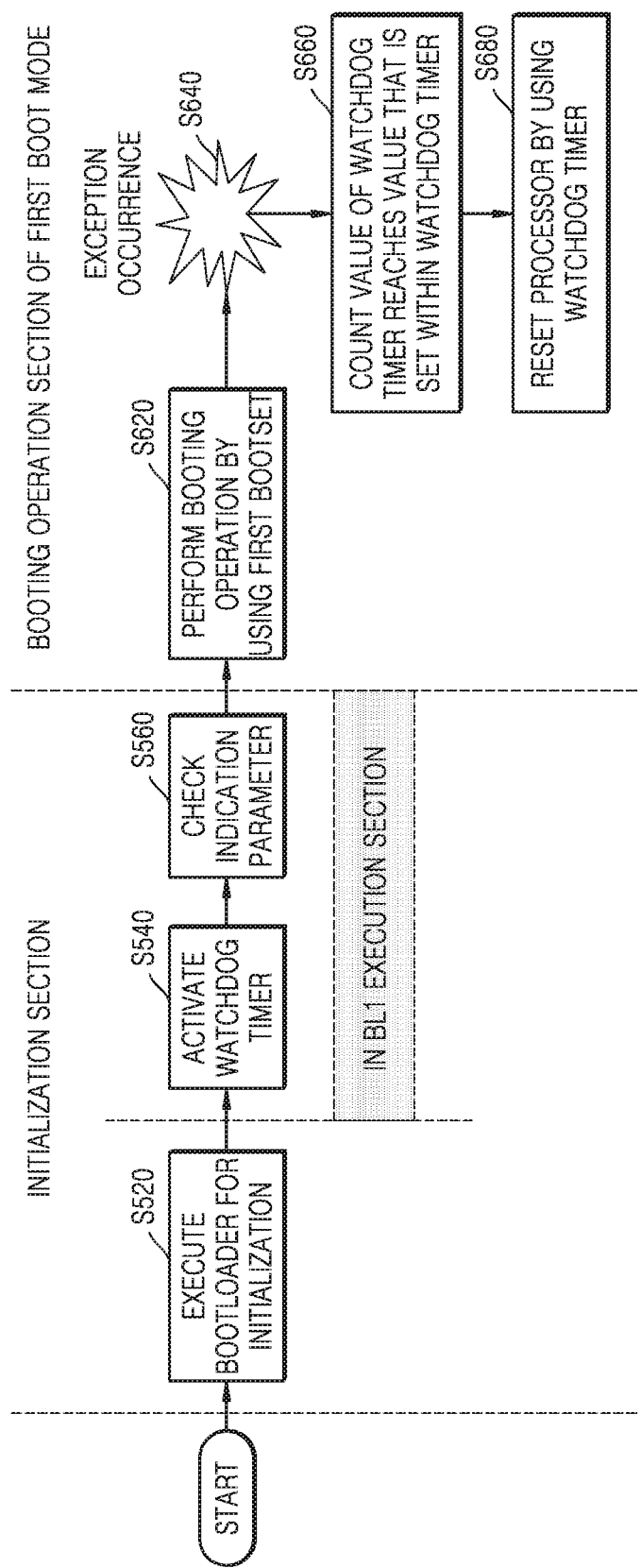
FIGS. 11A through 11C show a flowchart of a method of booting by using the booting device in a case in which an exception occurs, according to an example embodiment.
Figure 11B:
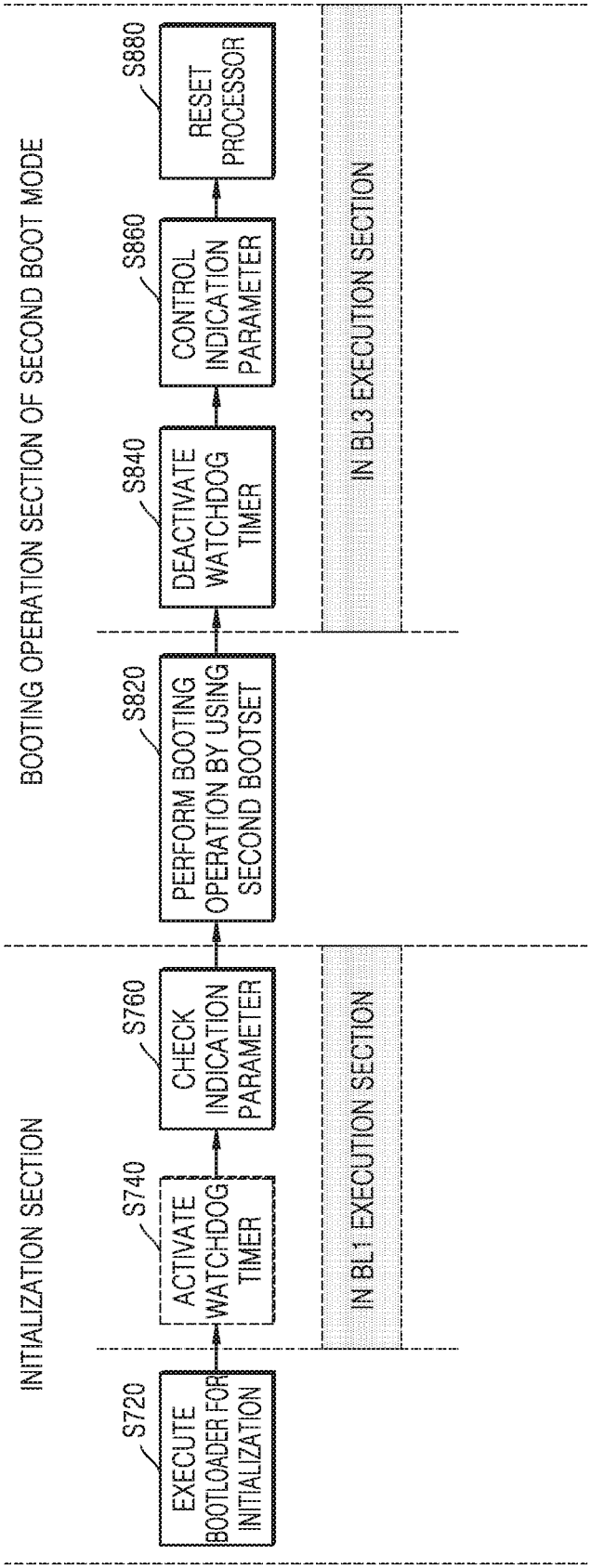
Figure 11C:
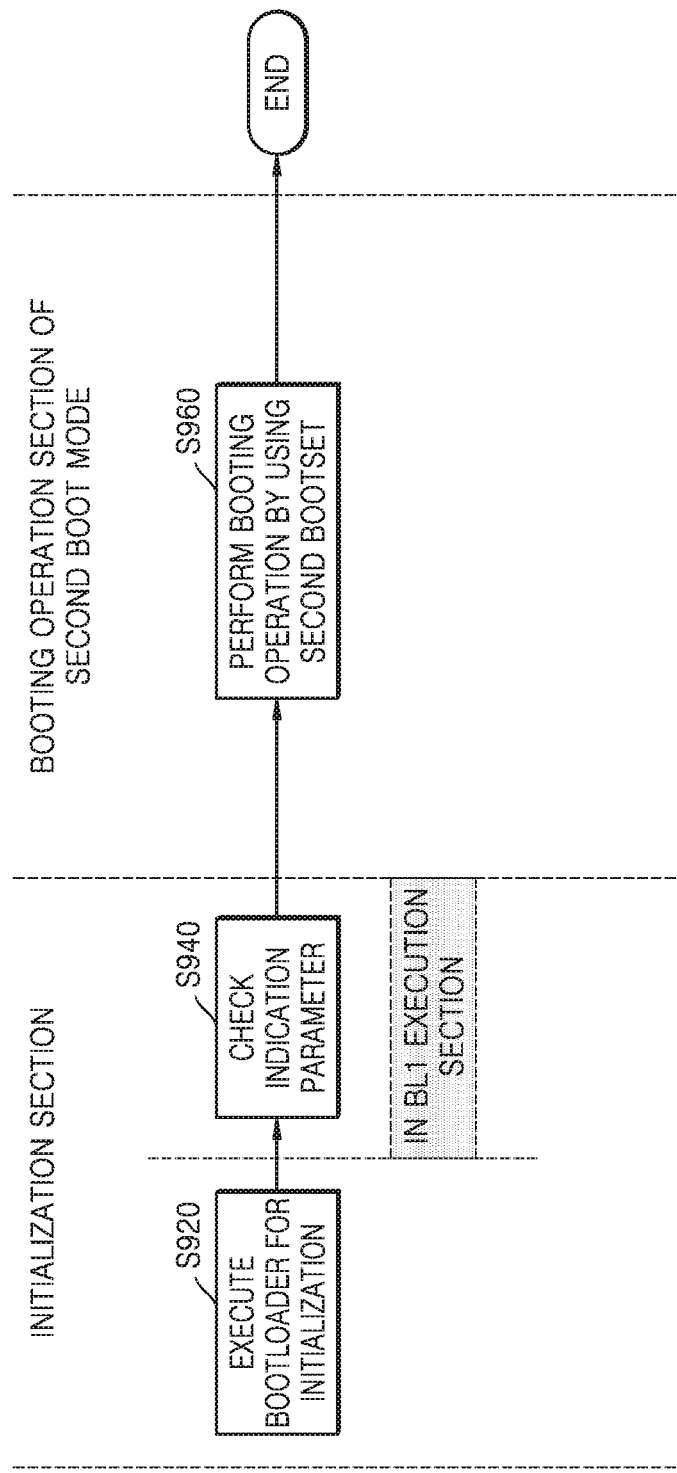

FIGS. 11A through 11C show a flowchart of a method of booting the booting device when an exception occurs, according to an example embodiment. FIGS. 11A through 11C are described with reference to FIG. 10.

FIG. 11A shows a flowchart of operation until the processor is reset in response to detection of the exception occurrence. For convenience of explanation, in an initial stage of the operation shown in FIG. 11A, a case will be described in which the indication parameter indicates the first boot mode using the first bootset BootSet_1 and the booting device performs the booting operation by using the first bootset BootSet_1.

Referring to FIG. 1, in the initialization section, the booting device may execute the bootloader for initialization (S520). For example, the booting device may execute the first bootloader BL0 and/or the second bootloader BL1.

The booting device may activate the watchdog timer 300 (S540). For example, the exception manager 260 may activate the watchdog timer 300 by providing an exception detector control signal CTRL_ED to the watchdog timer 300.

The booting device may check the indication parameter IP (S560). The indication parameter IP may be stored in the non-volatile memory 520. When the indication parameter IP indicates the first boot mode using the first bootset BootSet_1, the booting device may use the first bootset BootSet_1 in a following booting operation section. In other words, the booting device enters a booting operation section in the first boot mode.

The activating of the watchdog timer 300 (S540) and the checking of the indication parameter IP (S560) by the booting device may be performed in a section executing the second bootloader BL1 between the bootloaders for initialization. In other words, the booting device may perform the operation S540 and the operation S560 by executing the second bootloader BL1.

However, execution of the aforementioned operations are not limited thereto, and in some example embodiments, the activating of the watchdog timer 300 (S540) and the checking of the indication parameter IP (S560), which are performed by the booting device, may be performed in the section in which the first bootloader BL0 is executed. For example, in some example embodiments in which the bootset includes the second bootloader BL1, the activating of the watchdog timer 300 (S540) and the checking of the indication parameter IP (S560) by the booting device may be performed in a section executing the first bootloader BL0.

In the booting operation section in the first boot mode, the booting device may perform a booting operation by using the first bootset BootSet_1 (S620). In some example embodiments, like operation S180 in FIG. 6, operation S620 may include executing a monitor, executing a third bootloader BL2, and executing a fourth bootloader BL3.

An exception may occur during the booting operation of the booting device by using the first bootset BootSet_1 (S640).

Due to the exception that occurred in the booting device, a counter value of the watchdog timer 300 may reach a value that is set within the watchdog timer 300 (S660). For example, when the exception occurs in the booting device, since the processor 200 may not provide a kick signal to the watchdog timer 300, the watchdog timer 300 is not initialized. Accordingly, the counter value of the watchdog timer 300 constantly increases and reaches the value that is set within the watchdog timer 300, and thus, the watchdog timer 300 may detect the exception occurrence.

By detecting the exception occurrence, the watchdog timer 300 may reset the processor (S680). For example, the watchdog timer 300 may reset the processor 200 by providing a reset signal to the processor 200. The processor 200 that has been reset may repeat the booting process, and following processes will be described with reference to FIGS. 11B and 11C.

Referring to FIG. 11B, the booting device may repeat the booting process.

In the initialization section of the booting process that has been repeated, the booting device may execute the bootloader for initialization (S720). For example, the booting device may execute the first bootloader BL0 and/or the second bootloader BL1.

The booting device may activate the watchdog timer 300 (S740). For example, the exception manager 260 may activate the watchdog timer 300 by providing the exception detector control signal CTRL_ED to the watchdog timer 300. Operation S740 is optional and may be omitted.

The booting device may check the indication parameter IP (S760). Due to the exception occurrence in the booting device, the booting device may use the second bootset BootSet_2 in the following booting operation section despite that the indication parameter IP indicates the first boot mode in which the first bootset BootSet_1 is used. In other words, the booting device may enter a booting operation section in the second boot mode. In some example embodiments, the booting device may identify an exception occurrence during the booting operation by the booting device, based on the reset signal and flag information received from the watchdog timer 300 by the processor 200. For example, the processor 200 may identify an exception occurrence during the booting process by using the processor 200, by receiving the reset signal from the watchdog timer 300 and confirming a flag value for each operation of the processor 200 included in the flag information.

The activating of the watchdog timer 300 (S740) and the checking of the indication parameter (S760) by the booting device may be performed in a section executing the second bootloader among the bootloaders for initialization. In other words, the booting device may perform operations S740 and S760 by executing the second bootloader BL1.

However, performance of the aforementioned operations is not limited thereto, and in some example embodiments, the activating of the watchdog timer (S740) and the checking of the indication parameter (S760), which are performed by the booting device, may be performed in the section in which the first bootloader BL0 is executed. For example, in some example embodiments in which the bootset includes the second bootloader BL1, the activating of the watchdog timer (S740) and the checking of the indication parameter (S760), which are performed by the booting device, may be performed in the section in which the first bootloader BL0 is executed.

In the booting operation section in the second boot mode, the booting device may perform a booting operation by using the second bootset BootSet_2 (S820). In some example embodiments, like operation S180 in FIG. 6, operation S820 may include executing the monitor, executing the third bootloader BL2, and executing a fourth bootloader BL3.

In the booting operation section in the second boot mode, the booting device may deactivate the watchdog timer 300 (S840). In some example embodiments, the booting device may also reset the watchdog timer 300.

The booting device may control the indication parameter (S860). For example, the processor 200 of the booting device may identify an exception occurrence based on a reset signal received from the watchdog timer 300 and flag information FI stored in the register in the booting device, and the booting device may change the indication parameter. For example, in a case in which the booting operation is performed again by using a second boot mode due to an exception that occurred during the first a booting operation, the booting device may control the indication parameter IP that indicates the first boot mode to indicate the second boot mode.

Next, the booting device may reset the processor 200 (S880).

The deactivating the watchdog timer 300 (S840), the control of the indication parameter IP (S860), and the resetting of the processor (S880), which are performed by the booting device, may be performed in an execution section of the fourth bootloader BL3 included in the second bootset BootSet_2. In other words, the booting device may perform operation S840, operation S860, and operation S880 by executing the fourth bootloader BL3 included in the second bootset BootSet_2. The processor 200 that has been reset may repeat the booting process, and following processes will be described with reference to FIG. 11C.

Referring to FIG. 11C, the booting device may repeat the booting process.

In the initialization section of the booting process that has been repeated, the booting device may execute the bootloader for initialization (S920). For example, the booting device may execute the first bootloader BL0 and/or the second bootloader BL1.

The booting device may check the indication parameter IP. Since the indication parameter IP that has been changed in operation S860 of FIG. 11B indicates the second boot mode in which the second bootset BootSet_2 is used, the booting device may use the second bootset BootSet_2 in a following booting operation section. In other words, the booting device enters a booting operation section in the second boot mode.

The checking of the indication parameter IP by the booting device (S940) may be performed in a section executing the second bootloader BL1 among the bootloaders for initialization. In other words, the booting device may perform operation S940 by executing the second bootloader BL1.

However, the performance of the aforementioned operation is not limited thereto, and the checking of the indication parameter IP by the booting device (S940) may be performed in the section in which the first bootloader BL0 is executed. For example, in an example embodiment in which the bootset includes the second bootloader BL1, the checking of the indication parameter IP by the booting device (S940) may be performed in the section executing the first bootloader BL0.

In the booting operation section in the second boot mode, the booting device may perform a booting operation by using the second bootset BootSet_2 (S960). In some example embodiments, like operation S180 in FIG. 6, operation S960 may include executing a monitor, executing a third bootloader BL2, and executing a fourth bootloader BL3.

FIG. 12 shows an example flag information FI according to an example embodiment. The flag information FI may include information for the booting device to determine whether the processor is being normally operated for each operation of the booting operation. In some example embodiments, the flag information FI may be stored in the register included in the booting device and updated during the booting process by the booting device.

The flag information FI may include a table of flag values corresponding to operations. In some example embodiments, the table of flag values may be initialized to a certain logic level, for example, to a second logical level 'L'. For example, when the booting device normally performs a first operation Operation_1 in the booting process, a flag value corresponding to the first operation Operation_1 may be updated to a first logical level 'H'. Likewise, when the booting device normally performs a $k^{th}$ operation Operation_k in the booting process, a flag value corresponding to the $k^{th}$ operation Operation_k may be updated to the first logical level 'H'.

A case in which an exception occurs when a $k+1^{th}$ operation Operation_k+1 is performed such that the $k+1^{th}$ operation Operation_k+1 is not normally performed, after the operations are normally performed up to the $k^{th}$ operation Operation_k, will be assumed and described. When the booting device may not normally perform the $k+1^{th}$ operation Operation_k+1, a flag value corresponding to the $k+1^{th}$ operation Operation_k+1 remains as a second logical level 'L'.

When the processor 200 receives a reset signal from the watchdog timer 300, the booting controller 220 of FIG. 10 may recognize whether an exception has occurred in a previous booting process, by confirming the flag information FI. For example, when the processor 200 receives the reset signal from the watchdog timer 300 and the exception occurrence in a previous booting process is identified as a result of confirming the flag information FI by the booting controller 220, the booting controller 220 may control the processor 200 to attempt a booting operation in a boot mode that is different from the boot mode indicated by the indication parameter IP.

The booting device may provide to the user debugging information including information regarding the operation of the booting process in which the exception occurred. For example, the booting device may provide the flag information FI to the user of the booting device as debugging information in a visual method, or the like. The user may correct errors or solve problems by using the debugging information that has been provided.

While the inventive concept has been particularly shown and described with reference to example embodiments thereof, it will be understood that various changes in form and details may be made therein without departing from the spirit and scope of the following claims. Therefore, the scope of the inventive concept is defined not by the detailed description of the embodiments but by the appended claims.

What is claimed is:

1. A system on chip comprising:
a non-volatile memory configured to store a first bootset in a first region, the first bootset including a booting operation bootloader for a first booting operation, to store a second bootset in a second region that is different from the first region, and to store an indication parameter selectively indicating a first boot mode in which the first bootset is used or a second boot mode in which the second bootset is used after a subsequent reset;
an exception detector configured to be activated after execution of an initialization bootloader, detect an exception occurrence in the system on chip, and generate a reset signal in response to the exception occurrence that is detected; and
a processor configured to reset the processor in response to the reset signal being received from the exception detector during a section in which the first booting operation is performed using the first bootset, based on the reset signal being received from the exception detector during the section, check the indication parameter for which of the first bootset and the second bootset is indicated, perform a second booting operation by using the second bootset despite the indication parameter indicating the first boot mode, change the indication parameter to indicate the second boot mode while a booting operation bootloader included in the second bootset is executed, and reset the processor after the indication parameter is changed.

2. The system on chip of claim 1, wherein the processor is configured to perform the first booting operation or the second booting operation by loading one of the first bootset and the second bootset from the non-volatile memory, based on the indication parameter.

3. The system on chip of claim 2, wherein the processor is configured to change the indication parameter to indicate the second boot mode when a bootset image update request is identified in the first boot mode in which the first booting operation is performed by using the first bootset.

4. The system on chip of claim 1, wherein the exception detector comprises a watchdog timer that detects the exception occurrence in response to a counter value being equal to a value that is set within the watchdog timer.

5. The system on chip of claim 4, wherein the processor is configured to update flag information for each of a plurality of operations of the processor, the flag information indicating for each operation whether the operation was performed normally, and store the flag information that is updated in a register in the system on chip, and select the second boot mode based on the reset signal received from the watchdog timer and the flag information, when an exception occurs during the first booting operation by using the first bootset.

6. The system on chip of claim 1, wherein the first region and the second region are two different memory blocks.

7. A method of booting a device, the method comprising:
checking an indication parameter that selectively indicates a first boot mode in which a first bootset is used or a second boot mode in which a second bootset is used after a subsequent reset, before a first booting operation, which is performed by using the first bootset;
activating a watchdog timer after executing an initialization bootloader, by using a processor;
based on the watchdog timer indicating that an exception occurs during the first booting operation performed by using the first bootset including a booting operation bootloader, checking the indication parameter and selecting of the second boot mode from among the first boot mode and the second boot mode despite the indication parameter indicating the first boot mode, and
performing, by using the processor, a second booting operation by using the second bootset stored in a second region of a non-volatile memory that is different from a first region in which the first bootset is stored, changing the indication parameter to indicate the second boot mode and resetting the processor.

8. The method of claim 7, wherein the performing of the second booting operation comprises changing of the indication parameter from indicating the first boot mode to indicating the second boot mode.

9. The method of claim 8, wherein the performing of the second booting operation comprises resetting of the processor after the changing of the indication parameter, and
wherein the second booting operation is performed by using the second bootset after the resetting of the processor.

10. The method of claim 7, wherein the processor is configured to update flag information for each of a plurality of operations of the processor, the flag information indicating for each operation whether the operation was performed normally, and store the flag information that is updated in a register in the device.

11. The method of claim 10, wherein the second boot mode is selected from among the first boot mode and the second boot mode despite the indication parameter indicating the first boot mode, based on the flag information and a reset signal that the watchdog timer provides to the processor.

12. The method of claim 7, wherein the first region and the second region are respectively placed in two different memory blocks in the non-volatile memory.

13. The method of claim 7, wherein the performing of the second booting operation comprises deactivating the watchdog timer.

14. The method of claim 7, wherein the performing of the second booting operation comprises resetting the watchdog timer.

15. An application processor comprising:
a register configured to store flag information;

a connectivity configured to receive information regarding a bootset image update; and a core configured to store an update bootset for update, which is received from the connectivity, as a first bootset in a non-volatile memory outside the application processor via a non-volatile memory interface and perform a second booting operation by using a second bootset, by loading the second bootset based on the flag information and a reset signal received from an exception detector, when an exception occurs during a first booting operation performed by using the first bootset received from the non-volatile memory interface, wherein, based on the reset signal being received from the exception detector, the core is configured to determine a bootset to load among the first bootset and the second bootset, based on an indication parameter that is received via the non-volatile memory interface and that indicates a first boot mode in which the first bootset is used and a second boot mode in which the second bootset is used after a subsequent reset, and wherein the core is configured to perform the second booting operation by using the second bootset despite the indication parameter indicating the first boot mode, change the indicating parameter to indicate the second boot mode during the second booting operation, and reset.

16. The application processor of claim 15, wherein the first bootset and the second bootset each comprises a third bootloader and a fourth bootloader.

\* \* \* \* \*